United States Patent [19]
Gordon

[11] 3,875,250
[45] Apr. 1, 1975

[54] ISOMERIZATION OF 1,2-DICHLORO-3-BUTENE TO 1,4-DICHLORO-2-BUTENE

[75] Inventor: Ronnie D. Gordon, Richardson, Tex.

[73] Assignee: Continental Oil Co., Ponca City, Okla.

[22] Filed: Dec. 26, 1972

[21] Appl. No.: 318,303

[52] U.S. Cl. ............................................. 260/654 R
[51] Int. Cl. ............................................ C07c 21/04
[58] Field of Search ............................. 260/654 R

[56] References Cited
UNITED STATES PATENTS
2,446,475  8/1948  Hearne et al. .................. 260/654 R FOREIGN PATENTS OR APPLICATIONS
1,336,283  7/1963  France ........................... 260/654 R Primary Examiner—Delbert E. Gantz
Assistant Examiner—Joseph A. Boska
Attorney, Agent, or Firm—Gerald L. Floyd

[57] ABSTRACT

1,2-dichloro-3-butene is isomerized to 1,4-dichloro-2-butene in the presence of an alumina catalyst.

5 Claims, No Drawings

ISOMERIZATION OF 1,2-DICHLORO-3-BUTENE TO 1,4-DICHLORO-2-BUTENE

BACKGROUND OF THE INVENTION

1. Field of the Invention

The present invention relates to the production of 1,4-dichloro-2-butene. In one aspect the present invention relates to a process for isomerization of 1,2-dichloro-3-butene to 1,4-dichloro-2-butene. In yet another aspect the present invention relates to the production of 1,4-dichloro-2-butene by allylic rearrangement of 1,2-dichloro-3-butene using a relatively high surface area alumina catalyst.

2. Brief Description of the Prior Art 1,4-dichloro-2-butene and 1,2-dichloro-3-butene are products generally formed by the chlorination of butadiene. 1,4-dichloro-2-butene is an important intermediate in the preparation of adipic acid, butenediol, and other valuable products. In addition, owing to the readiness with which the chlorine atoms of 1,4-dichloro-2-butene can be exchanged great industrial interest has developed in this isomeric product because of the synthetic organic chemicals which one can produce from such an intermediate.

Attempts have been made heretofore to provide processes wherein the isomeric products resulting from the chlorination of butadiene can be converted into a single relatively pure compound. For example, many processes have been proposed for the isomerization of 1,2-dichloro-3-butene to 1,4-dichloro-2-butene, such as the use of the condensation and polymerization catalyst. Examples of such catalysts are $FeCl_3$, $TiCl_2$, and $AlCl_3$. However, when employing such catalysts, elaborate precautions have had to be taken in order to avoid undesirable side reactions such as the polymerization or condensation of the unsaturated organic chlorides. Further, the procedures employing such metallic halide condensing agents have suffered from the disadvantage of low yields due to the occurrence of extensive dehydrochlorination and degradative side reactions.

Other prior art processes have proposed that the transposition to the 1,4-dichloro-2-butene be carried out in the absence of catalysts at elevated temperatures. However, the prolonged heating necessary to obtain the conversion to the desired isomer has also lead to excessive dehydrochlorination and undesired side reactions.

In efforts to overcome these problems of excessive dehydrochlorination and degradative side reactions other processes have been proposed by the prior art which call for exotic catalyst systems such as zirconium fluoride catalysts and the like. However, when employing such catalysts the conversion of the isomeric products to the desired isomer has not attained the degree sought and required. Therefore, new and novel processes are constantly being sought which will allow the production of a desired isomer from the isomeric mixture of dichlorobutene produced by chlorination of butadiene. It is especially desirable that a process be developed for allylic rearrangement of 1,2-dichloro-3-butene to 1,4-dichloro-2-butene. One such novel process is disclosed in the copending patent application of Ronnie D. Gordon entitled "Isomerization of 1,2-Dichloro-3-Butene to 1,4-Dichloro-2-Butene", filed as Ser. No. 131,771 on Apr. 6, 1971, now Pat. No. 3,836,592, wherein organic quaternary salts are employed as the catalyst in the allylic rearrangement of the 1,2-dichloro-3-butene. Another such novel process is disclosed in copending patent application of the same inventor and title filed June 7, 1971 as Ser. No. 150,721, now Pat. No. 3,709,949 wherein carbon catalysts are employed as the catalyst in the allylic rearrangement. However, additional improved processes are desired which do not depend on the use of such complex catalyst systems.

OBJECTS OF THE INVENTION

An object of the invention is to provide an improved process for producing 1,4-dichloro-2-butene.

Another object of the invention is to provide an improved process for the allylic rearrangement of 1,2-dichloro-3-butene to 1,4-dichloro-2-butene.

Another object of the present invention is to provide a process for the allylic rearrangement of 1,2-dichloro-3-butene to 1,4-dichloro-2-butene which employ an inexpensive, readily available catalyst, which does not require the use of solvents and which does not produce product contamination problems.

Another object of the present invention is to provide a process for producing 1,4-dichloro-2-butene which does not suffer from the disadvantage of the prior art and which is highly selective to the production of 1,4-dichloro-2-butene at yields of commercial significance.

These and other objects, advantages, and features of the present invention will be apparent to those skilled in the art from a reading of the following description.

SUMMARY OF THE INVENTION

In accordance with the present invention, it has been found that alumina catalysts have the property of catalyzing the allylic rearrangement of 1,2-dichloro-3-butene to 1,4-dichloro-2-butene so as to effect formation of the desired product in high yields, with ultimate selectivity, while maintaining at a minimum the formation of undesired byproducts.

Further, according to the invention a novel process is provided for the allylic rearrangement of 1,2-dichloro-3-butene to 1,4-dichloro-2-butene wherein the 1,2-dichloro-3-butene is heated at a temperature in the range of about 25°C to about 200°C in the presence of a catalytic amount of a high surface area alumina catalyst for an effective period of time to allow said allylic rearrangement.

DESCRIPTION OF THE PREFERRED EMBODIMENTS

As previously stated, we have now found that an alumina catalyst can be employed as the catalyst constituent in the allylic rearrangement of 1,2-dichloro-3-butene to 1,4-dichloro-2-butene. Advantages of the use of an alumina catalyst for the dichlorobutene isomerization are that alumina is an inexpensive catalyst and no solvent is required for the reaction to occur.

The alumina catalyst which can be employed in the allylic rearrangement of 1,2-dichloro-3-butene to 1,4-dichloro-2-butene in accordance with the process of the present invention can be a suitable alumina catalyst having a large surface area. The source of the alumina catalyst can vary widely. The alumina can be prepared by any one of a wide variety of known methods, such as: precipitation from sodium aluminate, hydrolysis of aluminum amalgam or calcination of hydrated alumina at temperatures of about 1100° to 1300°C. Particularly suitable are aluminas which have been heated in an oven to drive off water of hydration resulting in a slightly acidic product. Generally, the alumina will have a surface area of more than 10 square meters per gram ($m^2/g$). Especially suitable is an alumina having a surface area of from about 10 $m^2/g$ to 500 $m^2/g$.

The amount of the alumina catalyst employed for the allylic rearrangement of 1,2-dichloro-3-butene to 1,4-dichloro-2-butene can vary widely, the only requirement being that a catalytic amount of the alumina catalyst be present to allow the allylic rearrangement to occur. Generally, the alumina catalyst is employed in an amount ranging from about 0.01 to about 10% by weight of the 1,2-dichloro-3-butene. Desirable results have been obtained wherein the amount of the alumina catalyst employed is from about 0.01 to about 5% catalyst based on the weight of the 1,2-dichloro-3-butene.

The pressure at which the reaction of the present invention can be carried out can vary widely, generally being in the range of from atmospheric pressure to about 200 psi. Generally, it is desirable that the pressure range be from atmospheric to about 50 psi, with atmospheric pressure being preferred for the sake of convenience. When employing a pressure in the range of from atmospheric to 200 psi the temperature of the reaction can vary between about 25°C to about 200°C. However, desirable results have been obtained where the reaction is carried out at a temperature in the range of about 90°C to about 150°C and pressure is within the range of from atmospheric to about 50 psi. Especially desirable results have been obtained wherein the reaction is carried out under reflux conditions.

The duration of the reaction will also vary widely depending upon the amount of catalyst employed, as well as the reaction conditions. Generally when the reaction is completed, one will notice a temperature increase due to the formation of the isomeric product. This increase is due, in part, to the fact that 1,4-dichloro-2-butene has a higher boiling point than the 1,2-dichloro-3-butene. Generally from about 1 to about 8 hours are sufficient for the isomerization to occur. However, additional time will not adversely affect the isomerization product.

The process of the present invention can be carried out employing a batch type process or a continuous type process. In a batch type process 1,2-dichloro-3-butene or a mixture containing 1,2-dichloro-3-butene is charged with the alumina catalyst to a reaction zone and heated in liquid phase, preferably under reflux conditions. When reflux conditions are employed, the reaction mixture is maintained under such conditions until substantial conversion of the 1,2-dichloro-3-butene has been affected which is indicated generally by a rise of temperature in the reaction zone. Generally the reaction time will vary from about 1 to 8 hours. The refluxed material, e.g., 1,4-dichloro-2-butene is then recovered from the reaction zone and separated from the alumina catalyst. The product so separated can then be further purified, if desired, by any suitable means such as distillation and the like.

The process of the present invention may also be continuously carried out by feeding the 1,2-dichloro-3-butene or mixture containing same to a reaction zone containing the alumina catalyst in suspended form and continuously withdrawing the 1,4-dichloro-2-butene product from the reaction zone. Likewise, the starting material may be constantly percolated downward through a reaction zone packed with the alumina catalyst and the 1,4-dichloro-2-butene continuously withdrawn from the base of the reaction zone.

As previously stated, it is desired that the reaction be carried out in the liquid phase. However, as is evident to those skilled in the art, the reaction can be carried out by passing 1,2-dichloro-3-butene in vapor form downwardly through the catalyst. In addition, when employing a vapor phase process it may be desirable to admix the 1,2-dichloro-3-butene with an inert diluent gas, such as nitrogen. The exit gases from the heated tube, which will be a mixture of the 1,4-dichloro-3-butene and the inert carrier gas, are passed through a condenser to liquefy the 1,4-dichloro-2-butene and thus separate same from the inert gas. If desired, the condensed product can then be additionally treated such as by fractional distillation and the like to purify the product.

In order to more fully describe the present invention, the following examples are given. However, it is to be understood that the examples are for illustrative purposes only and are not intended to be a limitation on the invention.

EXAMPLE I 50 grams (0.4 mole) of 1,2-dichloro-3-butene and 1.0 grams of high activity alumina having a surface area of about 100 $m^2/g$ were charged to a 200 ml stainless steel autoclave. The reaction mixture was then heated to 150°C. The progress of the reaction was followed by gas chromatographic analysis and by noting that the temperature increased as the 1,4-dichloro-2-butene was formed. The pressure rose to about 50 psi. The following table shows the relative proportions of 1,2-dichloro-3-butene and 1,4-dichloro-2-butene present after various reaction times. It is noted that after a reaction time of four hours over 50% of the 1,2-dichloro-3-butene had been converted to the desired 1,4-dichloro-2-butene product.

TABLE I

| Reaction Time (Hours) | MOLE % | | |
|---|---|---|---|
| | 1,2-Dichloro-3-Butene | 1,4-Dichloro-2-Butene Cis | Trans |
| 0 | 99.82 | | 0.18 |
| 1 | 90.78 | 0.54 | 8.68 |
| 1.25 | 88.50 | 0.73 | 10.77 |
| 3 | 53.40 | 3.84 | 42.75 |
| 4 | 45.37 | 4.66 | 50.08 |

The above data clearly indicate the isomerization of 1,2-dichloro-3-butene to 1,4-dichloro-2-butene employing the alumina catalyst of the present invention.

Having thus described the invention, I claim:

1. A method for converting 1,2-dichloro-3-butene to 1,4-dichloro-2-butene which comprises contacting said 1,2-dichloro-3-butene with a catalytic amount of an alumina catalyst having a surface area in the range of from about 10 to 500 square meters per gram at a temperature in the range of from about 25°C to about 200°C for an effective period of time to allow allylic rearrangement of said 1,2-dichloro-3-butene to said 1,4-dichloro-2-butene and recovering said 1,4-dichloro-2-butene.

2. The method of claim 1 wherein said contacting is carried out at a perssure within the range of atmospheric pressure to about 200 p.s.i.

3. The method of claim 2 wherein said catalyst is present in an amount within the range of about 0.01 to 10 weight percent based on the weight of said 1,2-dichloro-3-butene.

4. The method of claim 3 wherein said 1,2-dichloro-3-butene is contacted with from about 0.1 to 5 weight percent of said catalyst having a surface area in the range of about 10 $m^2/g$ to 500 $m^2/g$ at a temperature in the range of about 90°C to about 150°C and at a pressure in the range of atmospheric pressure to about 50 psi.

5. The method of claim 4 wherein the reaction is carried out in an autoclave.

* * * * *